May 21, 1963     S. O. PETERSON     3,090,587
FASTENING DEVICE
Filed Aug. 10, 1961
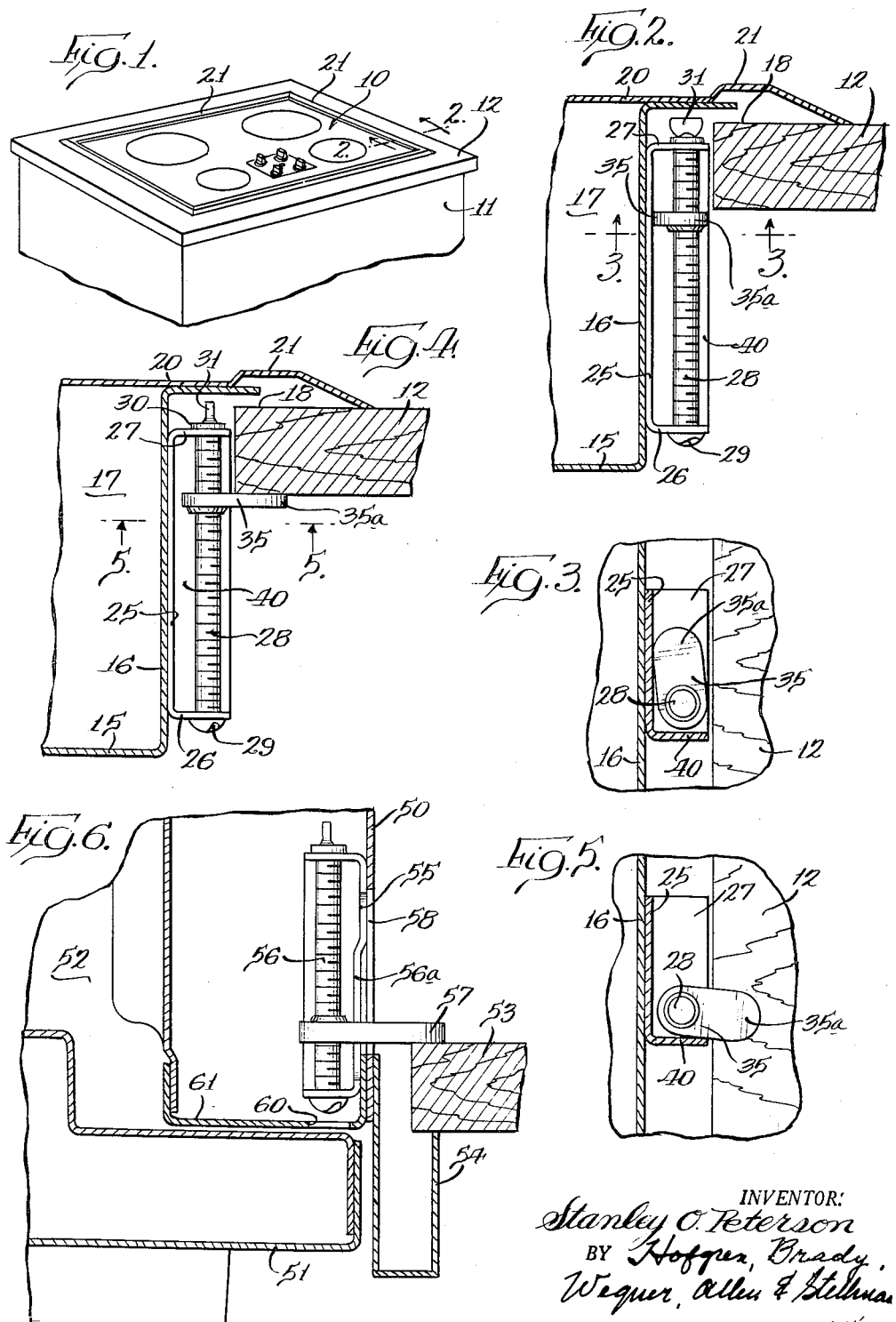

United States Patent Office 3,090,587
Patented May 21, 1963

3,090,587
FASTENING DEVICE
Stanley O. Peterson, Wisconsin Rapids, Wis., assignor to Preway Inc., a corporation of Wisconsin
Filed Aug. 10, 1961, Ser. No. 130,613
2 Claims. (Cl. 248—27)

This invention relates to a fastener and more particularly to a fastener for attaching in place a built-in appliance or the like.

An object of this invention is to provide a new and improved fastener for a built-in appliance or the like.

Another object of the invention is to provide a fastener for securing an appliance in located position having a fastener supported by the appliance with a threaded member rotatably mounted thereon and a clamp lug mounted on the threaded member and having a limit of swinging movement as it is adjusted along the threaded member, whereby the lug automatically is caused to lie behind or beneath a support for the appliance.

Another object of the invention is to provide a fastener as defined in the preceding paragraph in which the clamp lug has an out-of-the-way position permitting location of the appliance in a support and wherein the fastener may then readily be operated with the clamp lug automatically moving to a position for engagement with the surrounding support.

Further objects and advantages will become apparent from the following detailed description taken in connection with the accompanying drawings in which:

FIGURE 1 is a perspective view showing a built-in counter top appliance located in a cabinet;

FIGURE 2 is a fragmentary vertical section on an enlarged scale taken generally along the line 2—2 in FIGURE 1;

FIGURE 3 is a bottom plan view taken generally along the line 3—3 in FIGURE 2;

FIGURE 4 is a view similar to FIGURE 2 showing the appliance secured to the counter top;

FIGURE 5 is a view similar to FIGURE 3, but showing the parts as positioned in FIGURE 4; and FIGURE 6 is a fragmentary horizontal section of the fastener device in association with a built-in oven.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

In the embodiment of FIGURES 1 to 5, a counter top burner unit which may be either gas or electric is indicated generally at 10 and is located within a counter 11 having a counter top 12. As shown in FIGURES 2 and 4, the appliance has a casing with a bottom 15 and a plurality of side walls, one of which is indicated at 16, and a back wall 17. The appliance casing is fitted into a recess in the counter with parts of the counter top 12 surrounding the casing and in spaced relation therewith with one part of the counter top being indicated at 18.

In order to close off the space between the walls of the appliance casing and the counter as well as to support the appliance within the recess, a top panel 20 has a flange 21 extending laterally outward beyond the perimeter of the casing and into engagement with the counter top. Although the flange 21 is shown formed integrally with the top panel 20, it may be a separable part as is well known in the art.

In order to securely fasten the appliance in the counter, a plurality of fasteners are associated therewith, with one of these fasteners being shown in FIGURES 2 to 5. Actually, a plurality of these fasteners are disposed about the peripheral walls of the appliance casing and are arranged for simple operation from beneath the appliance.

The fastener device comprises a frame 25 having a longitudinal extent and secured to the outside of the side wall 16 in a suitable manner which can be, for example, either bolts, welding, or riveting. The frame has spaced apart opposed ends 26 and 27 which rotatably mount a threaded member 28 which extends normal to the top panel 20 of the appliance and parallel to the longitudinal extent of the frame. The threaded member has a head 29 lying beneath the frame end 26 and as shown is slotted for engagement by a screw driver and the other end of the threaded member has a washer 30 captured by a deformed end 31 of the threaded member whereby the threaded member is held on the frame. The threaded member is loosely mounted within openings in the frame ends 26 and 27 whereby the member can be easily rotated.

A clamp lug 35 is threadably mounted on the threaded member and is generally rectangular in shape to have a part thereof extend a distance from the threaded member with this part terminating in an end 35a.

In initially installing the appliance, the fasteners are retracted with the clamp lug 35 in a retracted position, as shown in FIGURES 2 and 3, whereby the appliance can readily fit into the recess in the counter top 12. This results in the flange 21 supporting the appliance within the counter. In order to then securely locate the appliance in the counter opening, the threaded member 28 of each fastener is rotated. Initially, upon clockwise rotation of the member, the clamp lug 35 is swung out to the position shown in FIGURES 4 and 5. To retain the clamp lug in this extended position, the frame has a flange 40 extending at right angles to the side wall 16 of the casing, which, as shown in FIGURE 5, is contacted by the clamp lug to hold the lug in extended position, whereby continued rotation of the threaded member 28 having a left-hand thread, moves the clamp lug up against the underside of the counter to tightly engage therewith and secure the appliance in position. It will be noted in comparing FIGURES 3 and 5 that the frame for the fastener is open at one side to permit the clamp lug 35 to easily swing to a retracted position for insertion and removal of the appliance while permitting free swing of the clamp lug to an extended position merely by rotation of the threaded member 28 by engagement of the head thereof by a tool. This avoids any necessity to attempt to reach between the casing of the appliance and the surrounding cabinet to locate the clamp lug in extended position.

Another embodiment of the invention is shown in FIGURE 6 in association with a built-in oven in which the oven has a side wall 50 and an oven door 51 closing an oven opening 52. The oven is shown mounted within a cabinet, a part of which is shown at 53. The space between the oven and the cabinet is closed by a rim 54 suitably secured to the side wall 50 of the oven. In this embodiment of the fastener, a frame 55 is secured to the interior of the oven side wall 50 and supports a threaded member 56 with the frame member 55 being centrally depressed at 56a as viewed in FIGURE 6 whereby a clamp lug 57 on the threaded member can extend outwardly through an opening 58 in the oven side wall 50 and at generally right angles to the side wall to engage the back side of the cabinet 53. The lug is maintained in extended position during rotation of the threaded member 56 by engagement with the depressed part 56a of the frame. In this embodiment, the threaded member 56 is provided with a right-hand thread whereby clockwise rotation of the threaded member results in advancing the clamp lug 57 towards the cabinet 53 whereby the oven is securely attached in place. As in the embodiment of FIGURES 1 to 5, the clamp lug 57 may move into the interior of the oven as permitted by a suitable dimensioning of the opening 58 in the oven side wall. Operation of the threaded member is derived by insertion of a screw driver or the like through an opening 60 in a front panel 61 of the oven which is exposed when the oven door 51 is open.

As will be seen from the foregoing, a construction has been disclosed in which an appliance may easily be inserted in a recess provided therefor and the appliance securely located in position without requiring access to the actual location of clamping with the fastening device being a simple construction embodying a frame, a threaded member and a clamp lug on the threaded member which can be attached to the casing of the appliance in any desired location.

I claim:

1. An appliance fastener comprising, a frame having a longitudinal extent, a threaded member rotatably mounted on said frame, a clamp lug threaded on said rotatable member, and a flange on said frame at one side of the rotatable member extending for substantially the length thereof engageable by the clamp lug for limiting the swinging movement of the clamp lug with the threaded member and the space at the side of the rotatable member opposite the flange being free of obstruction for location of the clamp lug in retracted position.

2. A built-in appliance having a casing locatable within a recess in a cabinet with portions of the cabinet surrounding the casing, comprising, a flange attached to the casing for spanning portions of the surrounding cabinet, a plurality of casing side walls, and means on said side walls for securing the casing to the cabinet comprising, a fastener frame of longitudinal extent attached to the casing side wall to lie between the casing and the cabinet, a threaded member rotatably mounted on said frame and extending generally normal to an exposed surface of the appliance with an exposed head engageable by a tool, a clamp lug threaded on said threaded member, and a flange on the frame at one side of said threaded member extending for substantially the length thereof for engagement by the clamp lug as it is swung due to rotation of the threaded member to hold the clamp lug in position behind the surrounding cabinet whereby the clamp lug can be moved tightly against the cabinet and press said flange against the cabinet with the space at the side of the threaded member opposite the flange being free of obstruction for location of the clamp lug in retracted position extending generally parallel to the casing wall.

References Cited in the file of this patent

UNITED STATES PATENTS

| | | |
|---|---|---|
| 1,775,665 | Behm | Sept. 16, 1930 |
| 2,966,325 | Pascucci | Dec. 27, 1960 |
| 3,018,062 | Berger | Jan. 23, 1962 |